US012011663B2

(12) United States Patent
Krishnamurthy

(10) Patent No.: US 12,011,663 B2
(45) Date of Patent: Jun. 18, 2024

(54) PERSONALIZED DATA DRIVEN GAME TRAINING SYSTEM

(71) Applicant: Sony Interactive Entertainment Inc., Tokyo (JP)

(72) Inventor: Sudha Krishnamurthy, Foster City, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/892,991

(22) Filed: Aug. 22, 2022

(65) Prior Publication Data

US 2023/0054035 A1 Feb. 23, 2023

Related U.S. Application Data

(60) Continuation of application No. 17/065,014, filed on Oct. 7, 2020, now Pat. No. 11,420,124, which is a continuation of application No. 16/173,755, filed on Oct. 29, 2018, now Pat. No. 10,828,566, which is a division of application No. 15/085,899, filed on Mar. 30, 2016, now Pat. No. 10,112,113.

(51) Int. Cl.
*A63F 13/67* (2014.01)
*A63F 13/422* (2014.01)
*A63F 13/5375* (2014.01)
*A63F 13/69* (2014.01)
*A63F 13/79* (2014.01)

(52) U.S. Cl.
CPC .......... *A63F 13/5375* (2014.09); *A63F 13/67* (2014.09); *A63F 13/69* (2014.09); *A63F 13/79* (2014.09); *A63F 13/422* (2014.09)

(58) Field of Classification Search
None
See application file for complete search history.

(56) References Cited

U.S. PATENT DOCUMENTS

| | | |
|---|---|---|
| 9,443,192 B1 | 9/2016 | Cosic |
| 9,498,704 B1 | 11/2016 | Cohen et al. |
| 10,112,113 B2 | 10/2018 | Krishnamurthy |
| 10,828,566 B2 | 11/2020 | Krishnamurthy |
| 10,828,567 B2 | 11/2020 | Krishnamurthy |
| 2005/0118996 A1 | 6/2005 | Lee et al. |
| 2013/0316779 A1 | 11/2013 | Vogel |

(Continued)

OTHER PUBLICATIONS

Bogdanovic et al., "Deep Apprenticeship Learning for Playing Video Games", Learning for General Competency in Video Game, Apr. 1, 2015, pp. 7-9.

(Continued)

*Primary Examiner* — Damon J Pierce
(74) *Attorney, Agent, or Firm* — Kilpatrick Townsend & Stockton LLP

(57) ABSTRACT

A video game console, a video game system, and a computer-implemented method are described. Generally, a video game and video game assistance are adapted to a player. For example, a narrative of the video game is personalized to an experience level of the player. Similarly, assistance in interacting with a particular context of the video game is also personalized. The personalization learns from historical interactions of players with the video game and, optionally, other video games. In an example, a deep learning neural network is implemented to generate knowledge from the historical interactions. The personalization is set according to the knowledge.

20 Claims, 9 Drawing Sheets

(56) References Cited

U.S. PATENT DOCUMENTS

| | | |
|---|---|---|
| 2015/0231502 A1 | 8/2015 | Allen et al. |
| 2016/0067612 A1 | 3/2016 | Ntoulas et al. |
| 2016/0279522 A1 | 9/2016 | De Plater et al. |
| 2017/0282063 A1 | 10/2017 | Krishnamurthy |
| 2019/0358545 A1 | 11/2019 | Aghdaie et al. |

OTHER PUBLICATIONS

Min et al., "Deep Learning-Based Goal Recognition in Open-Ended Digital Games", Department of Computer Science, Association for the Advancement of Artificial Intelligence, Jan. 2014, 7 pages.
Mnih et al., "Human-Level Control Through Deep Reinforcement Learning", Nature, vol. 518, No. 7540, Feb. 26, 2015, 13 pages.
Mnih et al., "Playing Atari With Deep Reinforcement Learning", In NIPS Workshop, DeepMind Technologies, Dec. 19, 2013, 9 pages.
Pearson , "This Deep Learning Algorithm Can Predict Your Next Move in a Video Game", Available Online at: https://www.vice.com/en_us/article/539yez/this-deep-learning-algorithm-can-predict-your-next-move-in-a-video-game, Mar. 25, 2016, 10 pages.

PERSONALIZED DATA DRIVEN GAME TRAINING SYSTEM

CROSS-REFERENCES TO RELATED APPLICATIONS

This application is a continuation of U.S. application Ser. No. 17/065,014, filed Oct. 7, 2020, which is a continuation of U.S. application Ser. No. 16/173,755, filed Oct. 29, 2018, which is a divisional of U.S. application Ser. No. 15/085,899, filed Mar. 30, 2016, and issued as U.S. Pat. No. 10,112,113 on Oct. 30, 2018, the contents of which are incorporated herein by reference in their entirety for all purposes.

BACKGROUND

Video games are becoming more and more complex. In the beginning, there were rules, and the rules were with a video game. For example, the rules defined what a video game player can and cannot do. For a goal to be attained in the video game, the video game presented a linear sequence of events and the video game player needed to respond with a linear sequence of actions. More recently, the rules have been relaxed and more video games have become open-ended. For example, a video game player can freely interact almost in any way, perform any action, and progress differently in a video game.

The complexity increase poses challenges to video game players and to game developers. On one hand, the large freedom given can confuse video game players who are unfamiliar with a video game. On the other hand, creating an effective game experience is challenging for a game developer. Because the progression in the video game can vary widely between video game players, anticipating what the progression could be like and what assistance is needed is very difficult. Typically, video game code provides game assistance or adapts a video game according to a number of possible scenarios. However, the video game code can be further improved to provide more adaptive game assistance and video games.

BRIEF SUMMARY

Generally, a video game system, a video game console, and computer-implemented methods are described. In an example, the video game system is configured to monitor interactions of players with video games. The video game console is communicatively coupled with the video game system. A player operates the video game console to interact with a video game. The video game system generates knowledge about how the players play the video games according to different experience levels. The knowledge is used to adapt the video game to the player's experience level and to adapt the assistance the player receives for interacting with contexts of the video game. A deep learning neural network is implemented to generate the knowledge from the interactions. The personalization is set according to the knowledge.

Further, a computer system is configured to perform the computer-implemented methods. The computer system is a component of the video game system, a component of the video game console, or is distributed between the video game system and the video game console.

In an example, a computer-implemented method includes multiple operations. In one operation, the computer system detects an interest of a video game player in assistance with interacting with a context of a video game. In another operation, the computer system determines an experience level of the video game player in playing the video game. In yet another operation, the computer system selects an action for the assistance from potential actions. The action is selected based on predicted outcomes of performing the potential actions given the experience level of the video game player. The potential actions and the predicted outcomes are derived based on automated analysis of a database of historical interactions with the context of other video game players of the determined experience level. In a further operation, the computer system causes a presentation about the selected action in the video game in response to detecting that the video game player needs the assistance.

In an example, a further computer-implemented method also includes multiple operations. In one operation, the computer system determines an experience level of a video game player in playing a video game. The video game player is represented by a virtual player in the video game. In another operation, the computer system generates a video game agent based on the experience level of the video game player. The video game agent is trained to interact with the virtual player based on the experience level of the video game player and based on historical interactions of video game players with the video game. In yet another operation, the computer system causes an execution of the video game agent in the video game such that the virtual player interacts with the video game agent in the video game.

In an example, a further computer-implemented method also includes multiple operations. In one operation, the computer system determines an experience level of a video game player in playing a video game. In another operation, the computer system generates a context of the video game from potential contexts. The context is generated based on predicted outcomes of presenting the potential contexts in the video game given the experience level of the video game player. The potential contexts and the predicted outcomes are derived based on historical interactions of video game players with the video game. In yet another example, the computer system causes a presentation of the context in the video game such that the video game is adapted to the experience level of the video game player.

A further understanding of the nature and the advantages of the embodiments disclosed and suggested herein may be realized by reference to the remaining portions of the specification and the attached drawings.

DETAILED DESCRIPTION

The present disclosure is directed to, among other things, apparatuses, methods, and systems for providing an adaptive video game that can also include a virtual assistant. Generally, a video game player (referred to herein as a "player") accesses a gaming system, such as one including a game console, to interact with the video game. The gaming system monitors the player's interactions. Interactions of other players are similarly monitored. Over time, a large dataset about interactions with the video game and, optionally, other video games is collected. The gaming system analyzes the dataset to build knowledge about how players play the video game.

Upon a player interacting with the video game, the gaming system adapts and provides assistance to the player as needed throughout the video game. The assistance is derived from the knowledge. For instance, the gaming system determines an experience level of the player. The experience level represents the amount of experience (quantitative or qualitative) that the player has in playing the video game, a genre of the video game, or video games in general. The gaming system also determines how other players at that same experience level have played the game. Accordingly, the gaming system generates the assistance to inform the player about the how-to-play given the player's experience level.

In addition, the gaming system adapts the video game to the player's experience level based on the knowledge. For instance, the gaming system determines narratives in the video game of the other players at the same experience level. The video game is adapted based on one or more of the narratives. Further, the gaming system generates a virtual player to challenge or coach the player and improve the player's gaming skills. The skills of the virtual player is also set based on how the other players have played the video game.

In an example, the gaming system implements an artificial intelligence model to build the knowledge. For instance, the artificial intelligence model utilizes a number of neural networks. A neural network is trained based on interactions of video game players with one or more video games. In operations, features associated with a player playing a video game are mapped to an input layer of a trained neural network. The output of the trained neural network predicts one or more of the player's experience level, possible assistance that can be presented to the player, possible ways to adapt the video game for the player, or a virtual player to play with the player.

Figure 1:
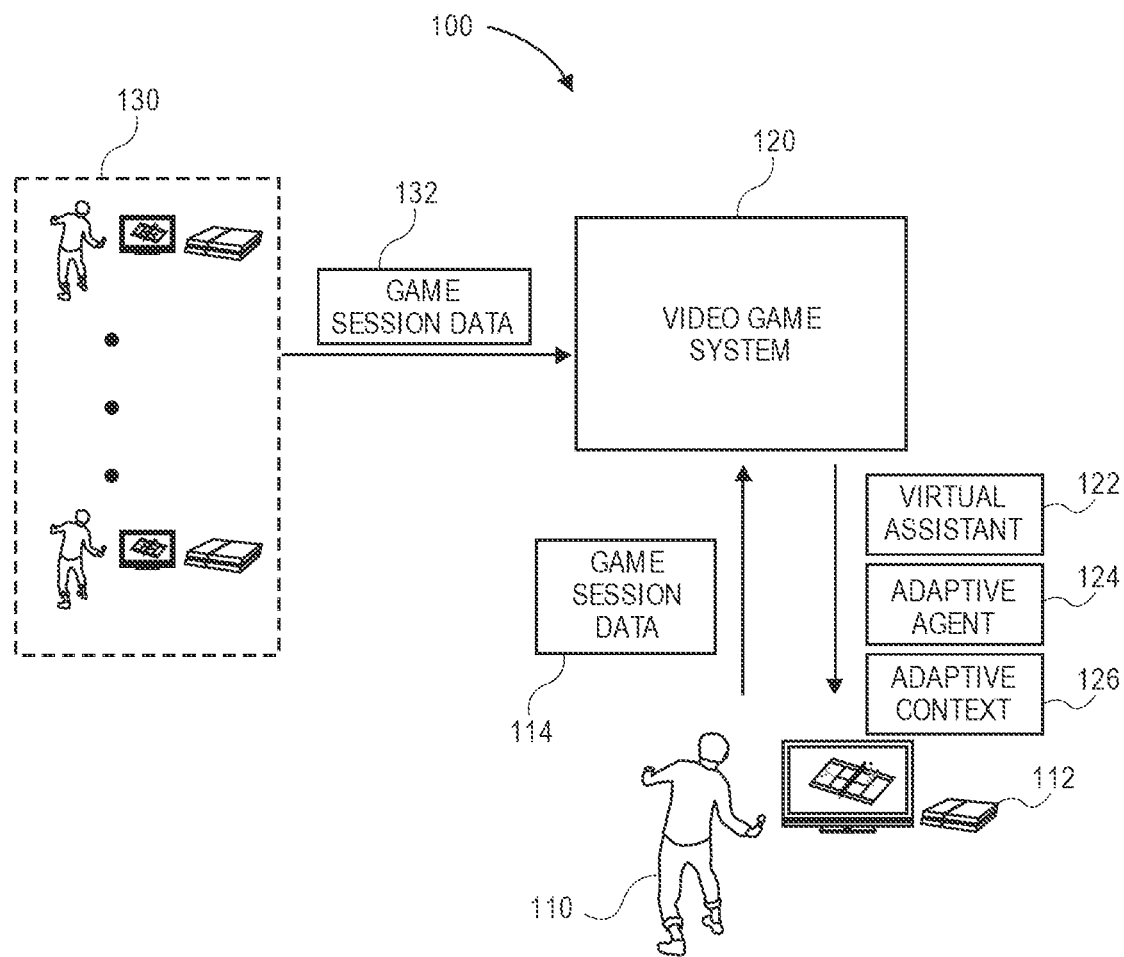
FIG. 1 illustrates an example system that monitors interactions of players with video games over time and that generates knowledge about the video games, according to embodiments of the present disclosure.

FIG. 1 illustrates an example system 100 that monitors interactions of players with video games over time and that generates knowledge about the video games. Generally, the knowledge includes how the video games are played such as how the players progress through the video games. The system 100 facilitates the presentation of certain aspects of the knowledge to the players. For instance, adaptive video games and adaptive game assistance in such video games are provided via video game consoles.

In an example, the system 100 includes video game consoles and a video game system 120 coupled with the video game consoles over a number of data networks. A data network can include a public data network, such as the Internet, or a private data network, such as an intranet. A player 110 operates a video game console 112 to interact with a video game. The video game console 112 communicates with the video game system 120 over a data network.

The video game system 120 represents a back end system that manages or directs certain aspects of playing video games via the video game consoles. For example, the video game system 120 is a server or a cloud-based computing system that provides or hosts video games, video game content, downloadable video games, video game code updates, video game purchases, player profiles, video game tokens, video game contexts, and/or other game-related components to the video game consoles.

Game session data 114 of the player 110 is collected by the video game system 120 from the video game console 112. The game session data 114 includes data about how the player 110 is playing a video game during a game session. For example, the data captures the video game title, time information about the game session, the played video game level, an identifier of the player, the player interactions with the video game (e.g., action buttons, for instance, pushed at a game joystick), the video game frames, progression through the video game, goals achieved, points collected, and/or other game session-related features.

The video game console 112 receives information about a virtual assistant 122, an adaptive agent 124, and an adaptive context 126 from the video game system 120. For example, in response to the game session data 114, the video game system 120 sends the information to the video game console 112. The information can include the virtual assistant 122, the adaptive agent 124, and/or an adaptive context 126 from the video game system 120. Additionally or alternatively, the virtual assistant 122, the adaptive agent 124, and the adaptive context 126 are already stored locally at the video game console 112 or remotely in a data store accessible to the video game console 112. In this case, the information identifies the virtual assistant 122, the adaptive agent 124, and/or the adaptive context 126.

In an example, the video game console 112 presents the virtual assistant 122 in the video game. The virtual assistant 122 is configured to assist the player 110 in interacting with a context of the video game. In a way, the virtual assistant 122 informs or educates the player 110 about various actions that are available in the video game for the interaction. The video game console 112 can present the virtual assistant 122 within the video game. Hence, the virtual assistant 122 helps the player 110 in choosing the next interactions with a current context in the video game (e.g., though a sequence of actions on a video game controller available to the player 110, such as a joystick) given the current context, previous interactions, and/or the player's experience level. Generally, the context represents an interactive graphical element that can be presented in the video game. A target that can be shot at, an obstacle that can be crossed, a person that can be questioned, a narrative of the video game, a scene in the video game, and other elements of a narrative of the video game are examples of contexts of the video game. In an example, the virtual assistant 122 is adapted to the experience level of the player 110. In addition, the provided assistance is adapted to the needs of the player 110. For instance, the virtual assistant 122 informs the players 110 about specific options to interact with the context in a successful way given the experience level. To illustrate, in a first person shooter video game, the context can be a target. The player 110 is at a beginner experience level. The virtual assistant 122 shows the player 110 an easy move and action to hit the target (e.g., "move to the right and hold the 'X' button on the joystick to have a straight shot"). The virtual assistant 122 can also show more complex moves and actions with an indication that such sequences are typically followed by expert shooters (e.g., "an expert maverick hold the 'O' button to roll on the ground and the hold the 'X' and 'O' buttons to throw a grenade"). Various triggers are available to invoke the virtual assistant 122. One trigger involves detecting that the player 110 needs assistance based on the game session data 114. Another trigger involves receiving a request from the player 110 for the assistance. Based on this trigger, the virtual assistant 122 can be enabled on demand (and, similarly, disabled).

In an example, the adaptive agent 124 represents game code that a computing device (e.g., the video game console 112) can execute. Upon execution, a virtual player may be instantiated in the video game. The virtual player represents a knowledgeable player that can have a certain level of experience in playing the video game. The virtual player is also adaptive in the sense that the virtual player's experience level can be a function of the player's 110 experience level. For instance, the virtual player is adapted to have the same or similar experience level as that of the player's 110. The virtual play can also be adapted to a context, a gaming need, a type of the video game, and/or other video game-related features. The virtual player can but need not be presented in the video game. To illustrate, the video game represents the player as an avatar in a virtual environment of the video game. The adaptive agent 124 is executed and presented as a virtual player in the virtual environment. The virtual player's experience level is the same as or better (e.g., the next level) than the player's 110 experience level. The video game console 112 can overlay the virtual player on top of the avatar or in another location of the virtual environment. In a golf video game, the overlay is used to coach the player 110 about properly driving a golf ball. In an educational video game, the virtual player is presented as a teacher providing verbal and signage instructions to the avatar.

In an example, the adaptive context 126 represents a context of the video game, where the context is adaptable based on a number of factors. An example factor is the player's 110 experience level. Other example factors are also possible such as progress in the video game, a mission goal, and/or other video game-related parameters. An object presented in the virtual environment, a scene, a virtual player, and/or other elements of a narrative of the video game are examples of the adaptive context 126. In an illustration, the video game is a first point shooter video game. If the player 110 is a beginner, the adaptive context 126 results in presenting a few and easy targets that the player 110 can shoot at in a video game scene. In comparison, if the player is an expert, the adaptive context 126 results in a much larger number and more difficult targets for that same video game scene.

In an example, the video game system 120 generates the virtual assistant 122, the adaptive agent 124, and the adaptive context 126 (or information about such components) from knowledge about how players play video games. For instance, the video game system 120 personalizes the game assistance 122, the adaptive agent 124, and the adaptive context 126 from the knowledge given the game session data 114 of the player 110. As such, the player's 110 video game experience is adapted to the player's 110 own parameter while also being augmented based on knowledge acquired from other players.

The video game system 120 derives the knowledge based on an automated analysis of a dataset of historical interactions of video game players with video games. The dataset can be stored in one or more databases on one or more storage devices. The analysis allows a prediction of the type and/or scope of assistance, agent, and/or context that the player 110 given the player's 110 game session data 114. For instance, based on the player's experience and how the player is interacting with a particular context within the video game, a prediction is made as to provide specific assistance about how to interact with the particular context and what the next presented context can be.

In an example, the automated analysis utilizes artificial intelligence. For instance, the video game system 120 applies deep learning, reinforcement learning, or other artificial intelligence-based algorithms to the database. Examples of this application are further illustrated in the next figures.

The dataset can be locally stored within or remotely accessible to the video game system 120. Generally, game session data 132 is collected from a plurality of game consoles 130. The database is populated with such game session data 132. Over time, the video game system 120 (or some other computing system, such as one of a third party) maintains the dataset with additionally collected game session data. In an example, the game session data 132 includes data about how players have played video games during various game sessions.

The data can have similar features (e.g., sequence of controller actions) as the game session data 114, where the features are populated with specific values of the respective players. The video games need not but can be the same as or can include the video game that the player 110 is playing. In addition, the game session data 132 can be organized or collected per genre of video games.

Figure 2:
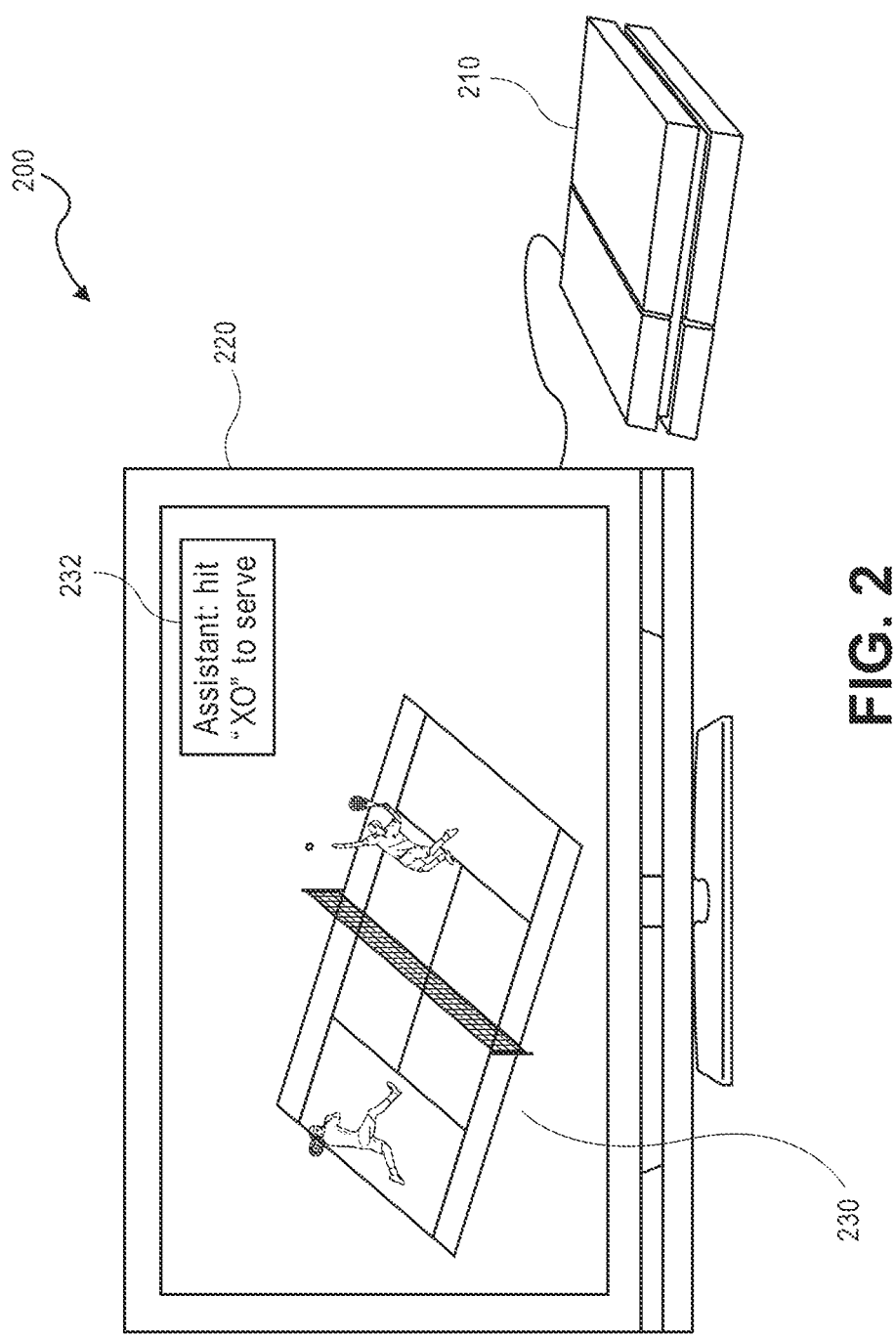
FIG. 2 illustrates an example system that presents a visual instance of a virtual assistant, according to embodiments of the present disclosure.

FIG. 2 illustrates an example system 200 that presents a visual instance of an virtual assistant. The visual instance is presented at user interface (UI) and includes a UI element. Other presentation modalities are also possible, including audible and tactile presentations.

As illustrated, a video game console 210 is communicatively coupled with a display 220. While the video game (or, the video game code) is executed on the video console 210, a presentation 230 of the video game is displayed on the display 220. The presentation 230 shows a virtual environment that includes different contexts of the video game. In this illustrative example, a tennis video game is executed. A tennis court, a court net, a tennis ball, a location of the tennis ball, tennis rackets, tennis players, a position of a tennis player constitute contexts of the virtual environment. Of course other video game contexts and/or video games altogether are possible.

The player is determined to have a certain experience level in playing the tennis video game. Upon a request from the player or if the player attempts a number of times to interact with a context (e.g., wrong or unsuccessful attempts to hit the tennis ball a number of times without any progress or for a certain time period), the video game console 210 determines that the player needs assistance with the interaction. Accordingly, the video console 210 inserts the virtual assistant as a UI element 232 in the presentation 230. The UI element 232 informs the player about how to interact with the context. For instance, the UI element 232 suggests, hints, provides options, or presents actions to successfully perform the interactions (e.g., hitting joystick buttons) according to the player's experience level. The UI element 232 can also present similar actions for other experience levels. In either illustrations, the UI element 232 can also identify the respective experience levels.

Generally, the UI element 232 is adapted based on a number of factors. These factors include, for example, the player's experience level, the context, the type of interaction, the progress of the players in the video game, and/or other video-game related parameters. The values of such parameters are captured in a game session data of the player. In an example, the game session data is input to an artificial intelligence model. The UI element 232 (or, more generally, the virtual assistant that defines the UI element 232) is an output of the artificial intelligence model. This model can be stored locally at the video game console 210. However, if the model is stored remotely (e.g., at the video game system), the video game console 210 can either retrieve the model or send the game session data (or a relevant portion thereof) and receive the virtual assistant or information about the virtual assistant (e.g., the parameters and parameter values for the UI element 232).

Figure 3:
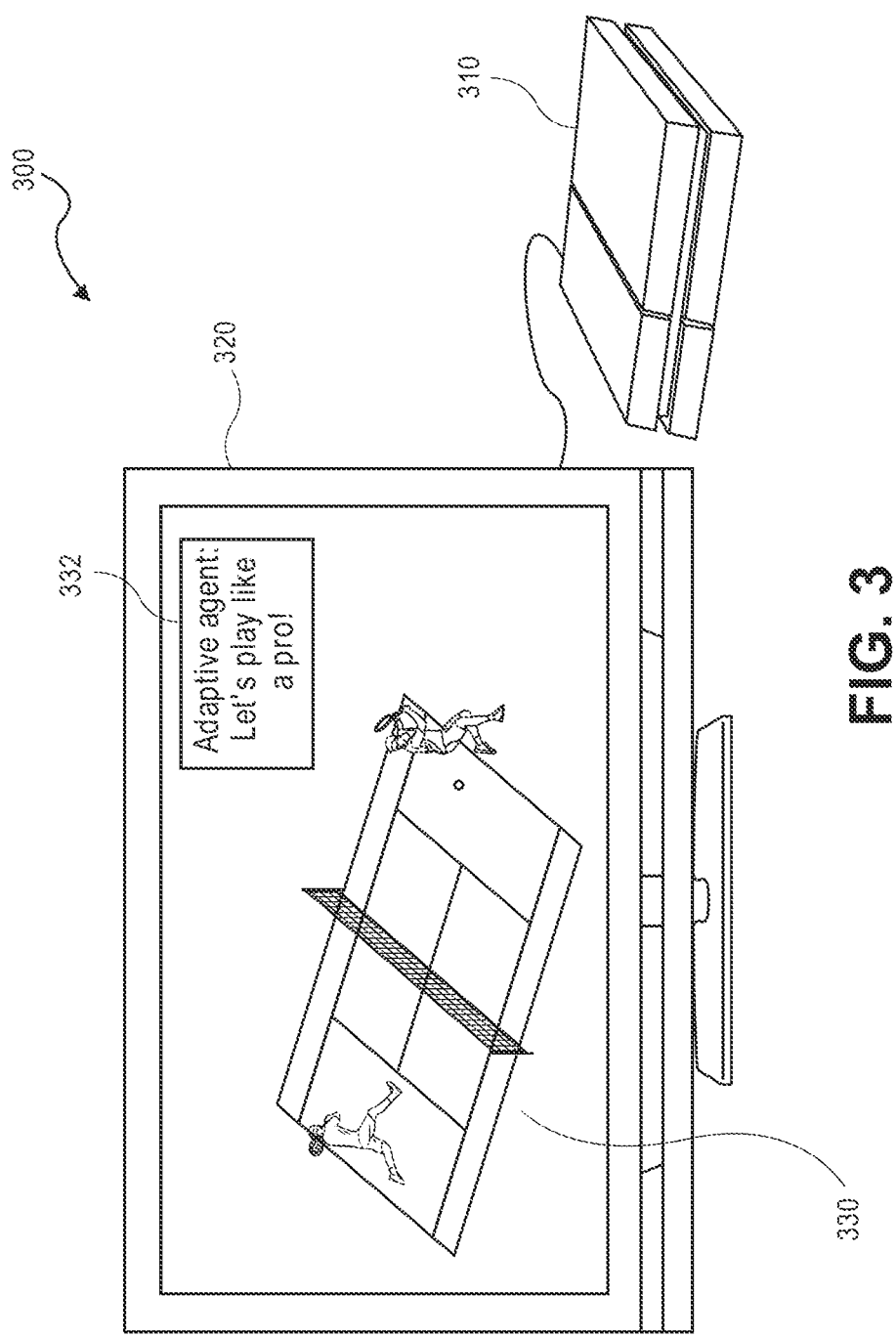
FIG. 3 illustrates an example system that presents a visual instance of an adaptive agent, according to embodiments of the present disclosure.

FIG. 3 illustrates an example system 300 that presents a visual instance of an adaptive agent. The visual instance is presented at user interface (UI) and includes a UI element. Other presentation modalities are also possible, including audible and tactile presentations. FIG. 3 also uses the illustrative tennis video game described in connection with FIG. 2. However, other video game contexts and/or video games altogether are possible.

As illustrated, a video game console 310 is communicatively coupled with a display 320. A presentation 330 of the video game is displayed on the display 320. In an example, the player is determined to have a certain experience level in playing the tennis video game. Upon a request from the player or based on a type or mode of the video game, the adaptive agent is provided. In this illustration, the adaptive agent represents a virtual player against which the player competes. The adaptive agent is set as having the same or a better experience level in playing the video game. As such, the adaptive agent can help the player improve video gaming skills.

In the presentation 330, one of the tennis players is an online handle (e.g., an avatar) of the actual player. The other tennis player is an online handle of the adaptive agent. A UI element 332 is used for a visual instance informing the player about the adaptive agent. For instance, the UI element 332 explains that the adaptive agent is a professional tennis player. The tennis player representing the adaptive agent is also a UI element that presents a visual instance of the adaptive agent itself. By playing the video game, the player would learn how to acquire enough skills to become a professional tennis video game player.

Generally, the adaptive agent is adapted based on a number of factors. These factors include, for example, some or all of the game session data of the player. Different techniques are available for adapting the adaptive agent. Commonly, the techniques use an artificial intelligence model. This model can be stored locally at ore remotely from the video game console 310.

In an example, the current game session data (e.g., representing the data for the current video game video frame and a number of preceding video game frames and/or spanning over an immediate time period, such as the last second) and the player's experience level are input to the artificial intelligence model. Parameters and parameter values are an output of the artificial intelligence model. These define the actions that the adaptive agent performs in the video game and/or that control the presentation of the adaptive agent's virtual player and other UI elements. In this example, the adaptive agent is truly personalized to the player's experience level and to the most up-to-date game session data. For instance and referring to a tennis video game, a beginner player requests a demonstration of how to serve a tennis ball. The adaptive agent demonstrates the sequence of controller actions that the beginner player invokes to do so.

In another example, the player's experience is input to the artificial intelligence model independently of the current game session data. An adaptive agent for that or higher experience level is selected as an output. The video game console 310 executes the adaptive agent. In this example, the adaptive agent is personalized to the player's experience level but is not necessarily adaptive to the current game session data (e.g., the most up-to-date contexts of the video game). For instance and referring back to the tennis video game, a beginner player is ready to play a tennis set and requests a demonstration of how to score points. The adaptive agent demonstrates sequences of controller actions that the beginner player can invoke, where these actions relate serving a tennis ball, responding, smashing the ball, and/or other tennis-related actions.

Figure 4:
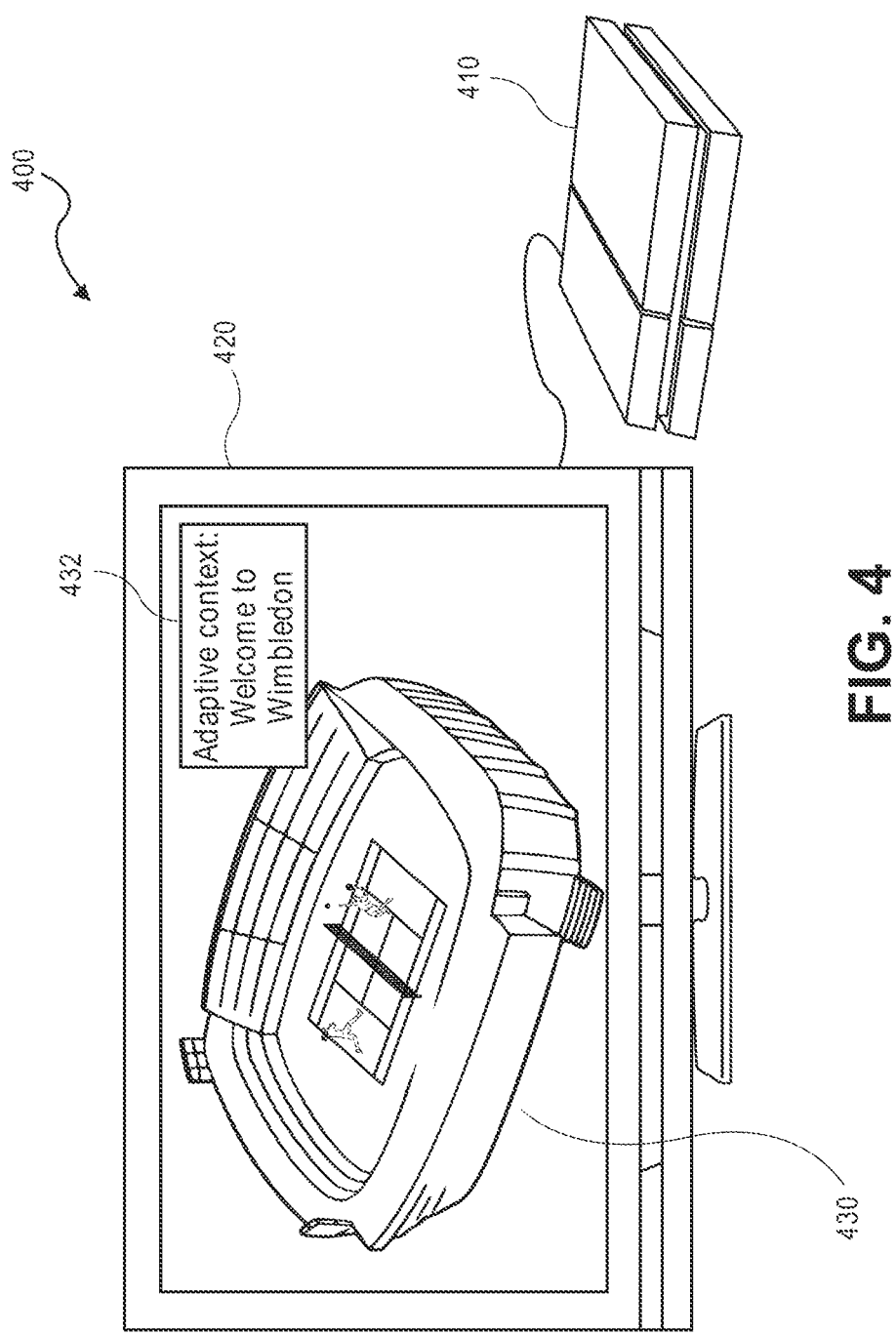
FIG. 4 illustrates an example system that presents an adaptive context, according to embodiments of the present disclosure.

FIG. 4 illustrates an example system 400 that presents an adaptive context. The adaptive context is presented as a user interface (UI) element at a UI. Other presentation modalities are also possible, including audible and tactile presentations. FIG. 4 also uses the illustrative tennis video game described in connection with FIG. 2. However, other video game contexts and/or video games altogether are possible.

As illustrated, a video game console 410 is communicatively coupled with a display 420. A presentation 430 of the video game is displayed on the display 420. In an example, the player is determined to have a certain experience level in playing the tennis video game. The adaptive context of the video game is personalized based on the experience level.

In the illustrative video game example, the adaptive context is the tennis court. If the player is playing at a professional experience level, the presentation 430 shows the tennis court as a part of stadium where a tournament is played. This and other UI elements associated with the adaptive context reflect the player's experience level (e.g., a UI element 432 inform the player about the stadium's location). On the other hand, if the player is a beginner, a different tennis court is presented. For instance, similarly to FIG. 2, the tennis court is shown absent of a tournament environment.

Generally, the adaptive context is adapted based on a number of factors. These factors include, for example, some or all of the game session data of the player. Different techniques are available for adapting the adaptive context. Commonly, the techniques use an artificial intelligence model. This model can be stored locally at or remotely from the video game console 410.

In an example, the current game session data (e.g., representing the data for the current video game video frame and a number of preceding video game frames and/or spanning over an immediate time period, such as the last second) and the player's experience level are input to the artificial intelligence model. Parameters and parameter values are an output of the artificial intelligence model. These define the adaptive contexts that should be presented in the presentation 430 and control the respective presentations (e.g., the format, the ordering, the sequence, and/or the timing of the adaptive contexts). In this example, the adaptive context is truly personalized to the player's experience level and to the most up-to-date game session data.

In another example, the player's experience is input to the artificial intelligence model independently of the current game session data. A narrative of the video game is selected as an output. The narrative includes different adaptive contexts. The video game console 410 presents this narrative and, as the game progresses, the different adaptive contexts. In this example, the video game in general (e.g., the narrative) is personalized to the player's experience level but is not necessarily adaptive to the current game session data (e.g., the most up-to-date game session data of the video game).

Figure 5:
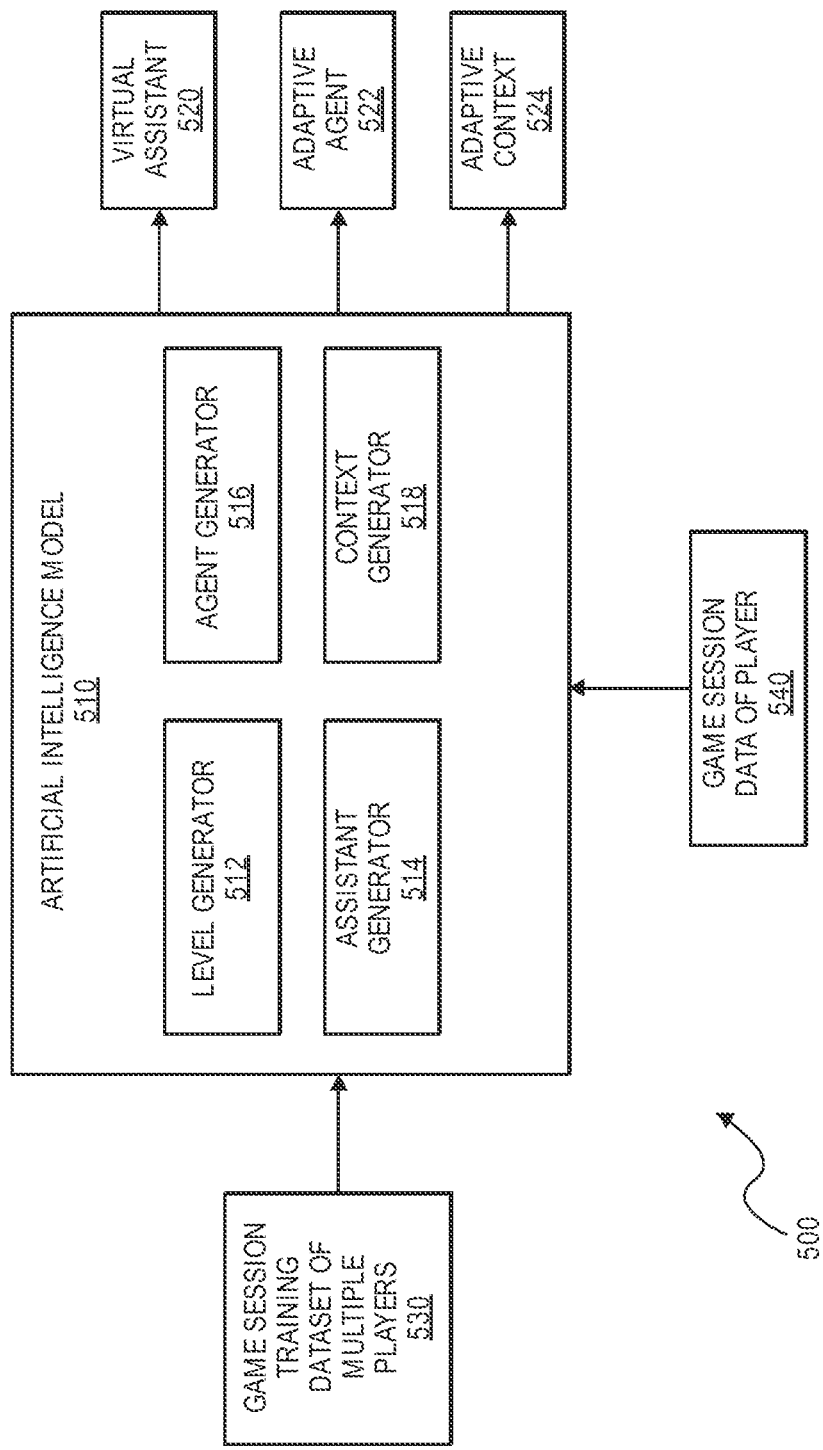
FIG. 5 illustrates an example system for automatic analysis of interactions of players with video games to predict potential outcomes associated with adapting the video games and providing adaptive assistance, according to embodiments of the present disclosure.

FIG. 5 illustrates an example system 500 for automatic analysis of interactions of players with video games to predict potential outcomes associated with adapting the video games and providing adaptive assistance. The system 500 represents a computing system (e.g., of a video game system, a video game console, or distributed between a video game system and a video game console) that implements an artificial intelligence model 510. The artificial intelligence model 510 is trained to predict the potential outcomes based on a training dataset. Once trained, player-specific game session data is input to the artificial intelligence model 510 to predict outcomes specific to that data. The system 500 initiates tasks based on these outcomes. These tasks include, for instance, providing game assistance, launching an adaptive agent, or adapting one or more contexts of a video game. As further illustrated in the next figures, a deep learning network is used to extract features from game session training dataset 530. The features can then be used to develop a deep learning model that can generate a variant of the video game, where the variant is adapted to the player's experience level.

In an example, the artificial intelligence model 510 is trained using the game session training dataset 530. This training dataset 530 includes game session data of multiple players. The player can have different experience levels. For instance, the training dataset 530 is collected over time from video game consoles of the players and is stored in a database. Different modules of the artificial intelligence model 510 are trained using the game session training dataset 530. Upon training, each module generates potential actions that can be performed and the resulting potential outcomes. Out of these predictions, the artificial intelligence model 510 (or, more generally, the system 500) selects one or more of the potential actions for affecting desired potential outcomes at certain likelihoods. For instance, the artificial intelligence model 510 is trained to set parameters and parameters values for a virtual assistant 520, an adaptive agent 522, and an adaptive context 524 for a player. The virtual assistant 520 can be presented using different UI elements in a video game. Generally, the virtual assistant guides a player about possible next steps that the player can take, given the current context of the video game. Similarly, the adaptive agent 522 can be presented as a virtual player in the video game. Generally, the virtual player interacts with an online handle (e.g., an avatar) of the player in the video game at an experience level that properly matches the player's experience level. The adaptive context 524 sets an aspect of the video game's narrative that is most likely suitable to the player's experience level.

In an example, a level generator 512 is implemented as a module of the artificial intelligence model 510. The level generator 512 is trained to generate a player's experience level based on a portion of the player's game session data 540. In this example, generating the player's experience level includes selecting the experience level from potential experience levels. For instance, the level generator 512 makes use of a deep learning network to extract features from the game session training dataset 530. The features can then be used to develop a deep learning model that can classify a player at a particular experience level. These features can include, for example, the speed and types of actions performed (e.g., the combination of buttons on a joystick), the progress in a video game, the accomplishments achieved, the trophies earned, the number of attempts per accomplishment, the score. The features can also relate to a player profile, such as the history of playing games, genres of played game, and other profile information. Hence, once trained, the level generator 512 predicts likelihoods of the player belonging to different experience levels based on an analysis of the player's game session data 540 against the extracted features. The player's experience level can be selected as the one having the highest likelihood. To illustrate, consider a simplified example where serving a tennis ball at 140 mph (225 km/h) in a tennis video game corresponds to a professional experience level. As such, if the player's game session data 540 indicates a pattern of such a serve speed, the player is classified as a professional level player.

In an example, an assistant generator 514 is also implemented as a module of the artificial intelligence model 510. The assistant generator 514 is trained to generate type and/or scope of assistance that can be provided to assist the player with an interaction with a context of a video game. The type and/or scope of assistance are based on a portion of the player's game session data 540. For instance, the assistant generator 514 makes use of a deep learning network to extract features from the game session training dataset 530. The features can then be used to develop a deep learning model that learns how players have interacted with the context (e.g., what actions were performed), the outcomes of the interactions (e.g., success, failure, number of attempts), and the experience levels of the players. Hence, once trained and given the player's game session data 540, the assistant generator 514 predicts likelihoods of successful interactions (or failed interactions) with the contexts if certain actions are performed. The virtual assistant 520 is set to present the actions that most likely result in successful interactions (additionally or alternatively, to present what actions to avoid for resulting in likely failures). Hence, the virtual assistant 520 helps the player with possible next step actions given a current state or context of the video game. To illustrate, consider a simplified example where a specific sequence of action buttons (e.g., holding the "X" button for two seconds, then releasing the "X" button while simultaneously pushing the "O" button) most likely results in a fast tennis serve at about 140 mph (225 km/h). If the player's game session data 540 indicates that the player is a professional and is attempting to hit a fast serve, the specific sequence of button is identified.

In an example, an agent generator 516 is also implemented as a module of the artificial intelligence model 510. The agent generator 516 is trained to generate type and/or scope of agent that the player can interact with in a video game. The type and/or scope of agent are based on a portion of the player's game session data 540. For instance, the agent generator 516 makes use of a deep learning network to extract features from the game session training dataset 530. The features can then be used to develop a deep learning model that learns how to best interact with contexts (e.g., resulting in the highest success likelihood) given a particular experience level. Hence, once trained and given the player's game session data 540, the agent generator 516 generates and defines how the virtual player (e.g., presented based on the adaptive agent 522) should interact with the online handle of the player in a video game that includes the context. To illustrate, consider a simplified example of training the player to improve a tennis serve. As with the previous illustration, if the player is a beginner, a virtual player at the beginner level would be generated. In comparison, if the player is a professional, a virtual player that plays at the professional level would be generated.

In an example, a context generator 518 is also implemented as a module of the artificial intelligence model 510. The context generator 518 is trained to generate features of contexts (e.g., type, presentation format, timing, interactivity level per context) for presentation in a video game. The features are based on a portion of the player's game session data 540. For instance, the context generator 518 makes use of a deep learning network to extract features from the game session training dataset 530. The features can then be used to develop a deep learning model that learns how players have interacted with contexts, the results of the interactions, and the features of the contexts given a particular experience level. Hence, once trained and given the player's session data 540, the context generator 518 determines how the adaptive context 524 generated for the player in a virtual environment of the video game. To illustrate, consider a simplified example of a tennis court as an adaptive context. In this illustration, the context generator 518 learns that as tennis skills improves, players are more likely to compete in advanced tournaments on difficult turf. Hence, if the player's game session data 540 indicates that the player is a professional and has been winning tournaments, a tennis court with a real grass turf in a prestigious stadium is generated.

Figure 6:
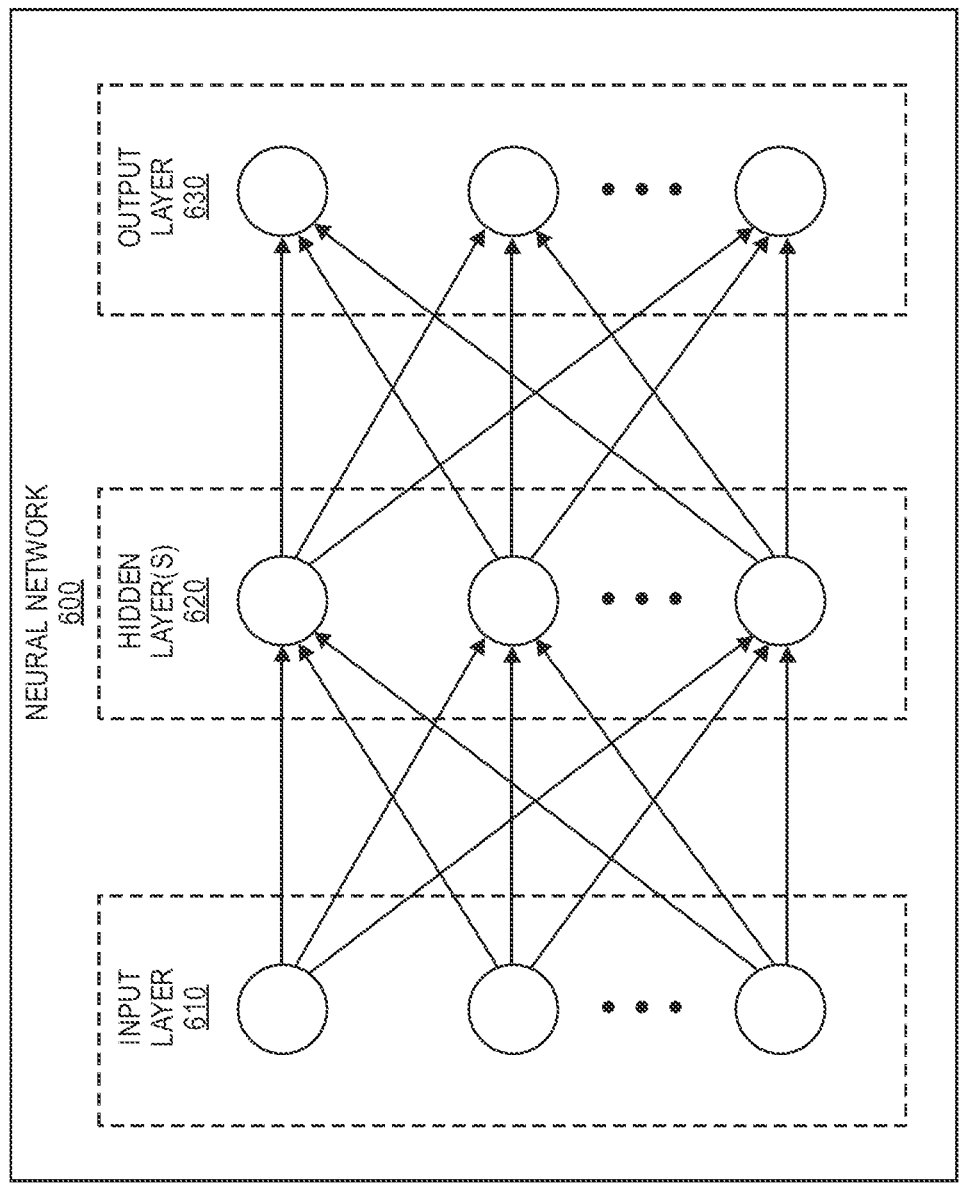
FIG. 6 illustrates an example neural network that an artificial intelligence model can implement to train one or more generator modules of the artificial intelligence model, according to embodiments of the present disclosure.

FIG. 6 illustrates an example neural network 600 that an artificial intelligence model can implement to train one or more modules of the artificial intelligence model. The neural network 600 represents an example of an automated analysis tool for analyzing game session training datasets and learning knowledge for a virtual assistant, an adaptive agent, and/or an adaptive context. In an example, the same neural network 600 is used separately to train each of a level generator, an assistant generator, an agent generator, or a context generator. In other words, an instance of the neural network 600 is used for each generator resulting in a model per generator. In this example, the training dataset can vary for each of the generator modules. In another example, the same neural network 600 is used to train collectively a combination of the generator modules. In other words, one model is generated for the combination. For instance, the level generator and the assistant generator are trained using a single instance of the neural network 600. In yet another example, the neural network 600 is used to train collectively all of the generator modules. In yet another example, different configurations and/or architectures of neural networks is used for each of the generators. In this example, some of the layers may be reused across the neural networks.

Different types of the neural network 600 are possible. In an example, the neural network 600 supports deep learning. Accordingly, a deep neural network, a convolutional deep neural network, and/or a recurrent neural network using supervised or unsupervised training can be implemented. In another example, the neural network 600 includes a deep learning network that supports reinforcement learning. For instance, the neural network 600 is set up as a Markov decision process (MDP) that supports a reinforcement learning algorithm.

Generally, the neural network 600 represents a network of interconnected nodes, such as an artificial neural network. Each node learns some information from data. Knowledge can be exchanged between the nodes through the interconnections. Input to the neural network 600 activates a set of node. In turn, this set of node activates other nodes, thereby propagating knowledge about the input. This activation process is repeated across other nodes until an output is provided.

As illustrated, the neural network 600 includes a hierarchy of nodes. At the lowest hierarchy level, an input layer 610 exists. The input layer 610 includes a set of input nodes. Each of these input nodes is mapped to a video game-related feature (e.g., features specific to a video game, to a player of the video game, and/or to interactions of the player with the video game).

At the highest hierarchical level, an output layer 630 exists. The output layer 630 includes a set of output nodes. An output node represents a decision that relates to interacting with a video game. In turn, a decision initiates an action with respect to an aspect of the video game. The action relates to a virtual assistant, an adaptive agent, and/or an adaptive context according to certain parameters and parameter values. For example, in the case of the assistant generator, the output nodes output the likelihood (probabilities) of the different actions that a player can take as a next step, given the current context. Based on these likelihoods, the action with the maximum likelihood or a number of top likelihoods (e.g., the top three) can be recommended to the player. The nodes in the neural network learn the parameters of the model that can be used to make such decisions. Generally, because the decisions output by the virtual assistant, adaptive agent, and adaptive context generator are different, the parameters and models that they learn may also be different.

A hidden layer 620 exists between the input layer 610 and the output layer 630. The hidden layer 620 includes "N" number of hidden layers, where "N" is an integer greater than or equal to one. In turn, each of the hidden layers also includes a set of hidden nodes.

The input nodes are interconnected to the hidden nodes. Likewise, the hidden nodes are interconnected to the output nodes. However, the input nodes are not directly interconnected to the output nodes. If multiple hidden layers exist, the input nodes are interconnected to hidden nodes of the lowest hidden layer. In turn, these hidden nodes are interconnected to the hidden nodes of the next hidden layer and so on and so forth. The hidden nodes of the highest hidden layer are interconnected to the output nodes.

An interconnection connects two nodes. The interconnection has a numeric weight that can be learned (e.g., based on the game session training dataset), rendering the neural network 600 adaptive to inputs and capable of learning.

Generally, the hidden layer 620 allows knowledge about the input nodes to be shared among all the tasks corresponding to the output nodes. To do so, a transformation $f$ is applied to the input nodes through the hidden layer 620. In an example, the transformation $f$ is non-linear. Different non-linear transformations $f$ are available including, for instance, a rectifier function $f(x)=\max(0,x)$.

The neural network 600 also uses a cost function c to find an optimal solution. The cost function measures the deviation between the prediction that is output by the neural network 600 (denoted as f(x)), for a given input x and the ground truth or target value, y. The optimal solution represents a situation where no solution has a cost lower than the cost of the optimal solution. An example of a cost function is the mean squared error between the prediction and the ground truth, for data where such ground truth labels are available. During the learning process, the neural network 600 can use backpropagation algorithm to employ different optimization methods to learn model parameters that minimize the cost function. An example of such an optimization method is stochastic gradient descent.

In an example, the neural network 600 is set-up as a multiple task (multitask) neural network. In this example, a single training set is used to train the neural network 600 to output a task selection from multiple potential tasks. In this example, the output layer 630 is mapped to the potential tasks. One set of potential tasks relates to virtual assistants. Another set of potential tasks relates to adaptive agents. Yet another set of potential tasks relates to adaptive contexts.

In an example, a neural network similar to the neural network 600 is set-up and trained for some of the generator modules. Such individual neural networks can be concatenated to form an overall neural network. For instance, a level generator-specific neural network is set-up and trained based on level generator-related features. A virtual assistant-specific neural network is also set-up and trained based on adaptive-related features. In this illustration, the two individual neural-networks are concatenated. In particular, the output of the level generator-specific neural network (e.g., a predicted experience level) becomes an input feature to the virtual assistant-specific neural network. Similar configurations are possible to concatenate a level generator-specific neural network with an adaptive agent-specific neural network and/or adaptive context-specific neural network.

Typically, the training dataset is composed of feature vectors. Each vector captures a set of features per player for a particular point of a video game (e.g., a point in time or a video game frame). The features relate to the training purpose. For instance, for the level generator, a feature vector includes speed and types of actions performed, progress in a video game, accomplishments achieved, number of attempts per accomplishment, scores, player profile, etc. For the assistant generator, a feature vector includes interactions of the player with contexts, the contexts, outcomes of the interactions, the experience level, etc. Similar features can be used for the agent generator. For instance, an applicable feature vector includes actions performed in the video game in response to the player's interactions, the interactions, contexts associated with the actions, outcomes of the actions, the experience level, etc. For the context generator, a feature vector includes type, presentation format, timing, an interactivity level of a context, the experience level, etc. for presentation in a video game. Such a feature vector can also vary depending on the specific video game or genre of the video game.

In an example, the training dataset for the neural network 600 is from a same data domain. For instance, the neural network 600 is trained for a specific video game. In this illustration, the data domain includes game session data collected for interactions of players with the video game. In another example, the training dataset is from different data domains. For instance, the neural network 600 is trained for a genre of video games. In this illustration, multiple data domains corresponding to video games of that genre are maintained and used for the training.

In an example, a machine learning algorithm is also possible. For instance, a machine learning algorithm is used for the level generator. In particular, the level generator is configured to classify players into experience levels according to a random forest algorithm.

Figure 7:
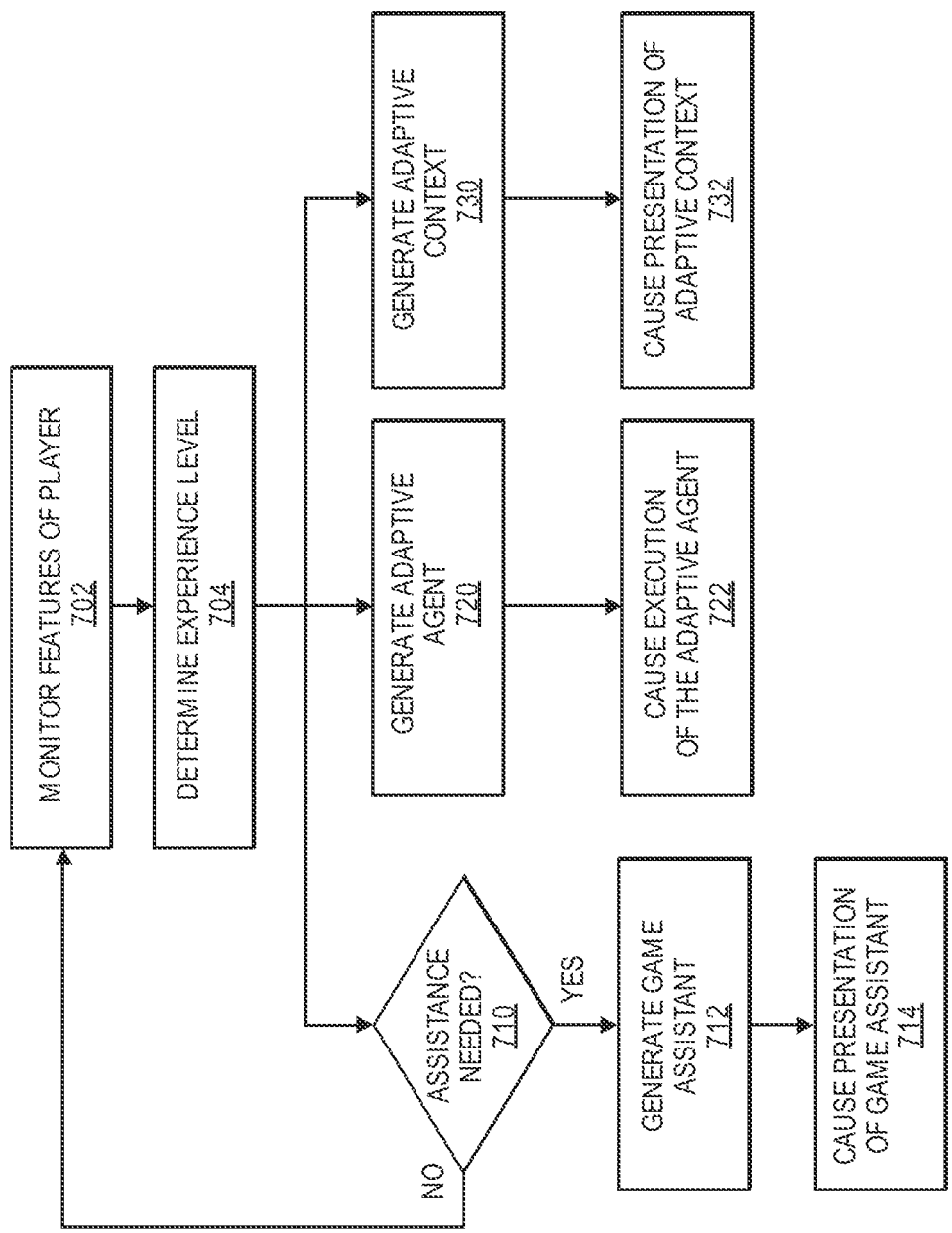
FIG. 7 illustrates an example flow for adapting a video game and providing assistance, according to embodiments of the present disclosure.

FIG. 7 illustrates an example flow for adapting a video game and providing assistance based on a player's level of experience. A computer system is illustrated as performing operations of the flow. In an example, the computer system includes a processor and a memory coupled to the processor. The processor executes computer-readable instructions stored in the memory. The computer-readable instructions include instructions for performing the operations. In an example, the computer system is a component of a video game system, a video game console, or distributed between the video game system and the video game console. Although the operations are illustrated in a particular order, some of the operations can be re-ordered or omitted.

In an example, the flow includes an operation 702, where features of a player are monitored. For instance, the computer system tracks the features during a video game session of the player playing a video game. The features represent game session data and include, for instance, a video game title, time information about the video game session, the played video game level, an identifier of the player, the player interactions with the video game (e.g., action buttons, for instance, pushed at a game joystick), the video game frames, progression through the video game, goals achieved, points collected, and/or other game session-related data.

In an example, the flow includes an operation 704, where an experience level of the player in playing the video game is determined. For instance, the computer system determines the experience level from a profile of the player. The profile can include an identifier of an experience level per video game type, genre of video games, awards the player has earned, a reputation of the player in a gaming environment, etc. In another illustration, the computer system predicts the experience level based on a level generator that implements a neural network or a machine learning algorithm. In this illustration, a portion of the player's features is input as a feature vector to the neural network or the machine learning algorithm. The output of the automated analysis is a potential experience level at a certain likelihood.

In an example, an operation 710 follows operation 704. At operation 710, a determination is made as to whether the player needs assistance in playing the video game. For instance, the computer system detects an interest of the player in assistance with interacting with a context of the video game. The interest can be explicit. In particular, the player can perform a set of actions or select a help button or menu option to request the assistance. The interest can also be determined based on an analysis of a portion of the video game session data. In particular, if a number of attempted interactions with the context is unsuccessful (e.g., does not result in progress) and exceeds a threshold number or a length of time of the attempted interactions exceeds a threshold duration, the computer system detects the interest in the assistance. The threshold number and threshold time can be a function of the experience level. Generally, the more experienced the player, the smaller the threshold number and threshold durations are because the player is expected to more easily play the video game. If no assistance is needed, operation 702 can be followed such that the monitoring of the player's features is continued. Otherwise, operation 712 is typically followed.

In an example, the flow includes an operation 712, where a virtual assistant is generated. For instance, the computer system predicts and selects parameters of the virtual assistant based on an assistant generator that implements a neural network. In this illustration, a portion of the player's features is input to the neural network as a feature vector. These features include the player's experience level, the current state of the video game (e.g., a video game frame, an identifier of a context, etc.), and previous sequence of interactions of the player. The output of the automated analysis is a set of selected parameters relevant for that experience level. The parameters define one or more actions that can be performed within the video game to interact with the context. To illustrate, if the context is serving a tennis ball, the parameters define speed and direction of hitting the tennis ball. The actions identify a sequence of joystick button pushes to achieve the speed and direction.

In an example, the flow includes an operation 714, where a presentation of the virtual assistant is caused. For instance, the computer system causes the video game console to present a UI element in a presentation of the video game. The UI element shows the virtual assistant (e.g., the parameters, thereby informing the user about how to interact with the context).

In an example, an operation 720 follows operation 704. At operation 720, an adaptive agent is generated. For instance, the computer system predicts and selects parameters and parameter values of the adaptive agent based on an agent generator that implements a neural network. In this illustration, a portion of the player's features is input to the neural network as a feature vector. These features include the player's experience level. The output of the automated analysis is a set of selected parameters and parameter values relevant for that experience level. In an example, the parameters and parameter values relate to a current context or a set of immediate next contexts that the player interacts with. For instance, if the player is learning to serve a tennis ball, the parameters and parameter values relate to how the tennis ball can be served for the player's experience level. In another example, parameters and parameter values also relate to more future contexts that can be independent of the current context. Continuing with the tennis video game illustration, the parameters and parameter values also identify how a backhand swing can be performed.

In an example, the flow includes an operation 722, where an execution of the adaptive agent is caused. For instance, the computer system causes the video game console to execute the adaptive agent. Upon execution, a virtual player is presented in a presentation of the video game. The virtual player is generated based on the parameters and parameter values of the adaptive agent.

In an example, an operation 730 follows operation 704. At operation 730, an adaptive context is generated. For instance, the computer system predicts and selects parameters and parameter values of the adaptive context based on a context generator that implements a neural network. In this illustration, a portion of the player's features is input to the neural network as a feature vector. These features include the player's experience level. The output of the automated analysis is a set of selected parameters and parameter values relevant for that experience level. In an example, the parameters and parameter values personalize a current context or a set of immediate next contexts such that a narrative of the video game is adapted to the player's features. Continuing with the tennis video game illustration, if the player is a professional tennis player, the parameters and parameter values relate a tennis tournament on a difficult tennis court.

In an example, the flow includes an operation 732, where a presentation of the adaptive context is caused. For instance, the computer system causes the video game console to present a UI element in a presentation of the video game. The UI element shows the adaptive context (e.g., the parameters and parameter values). The presentation can involve generating and changing the context. For example, a tennis turf is changed to the appropriate turf.

Figure 8:
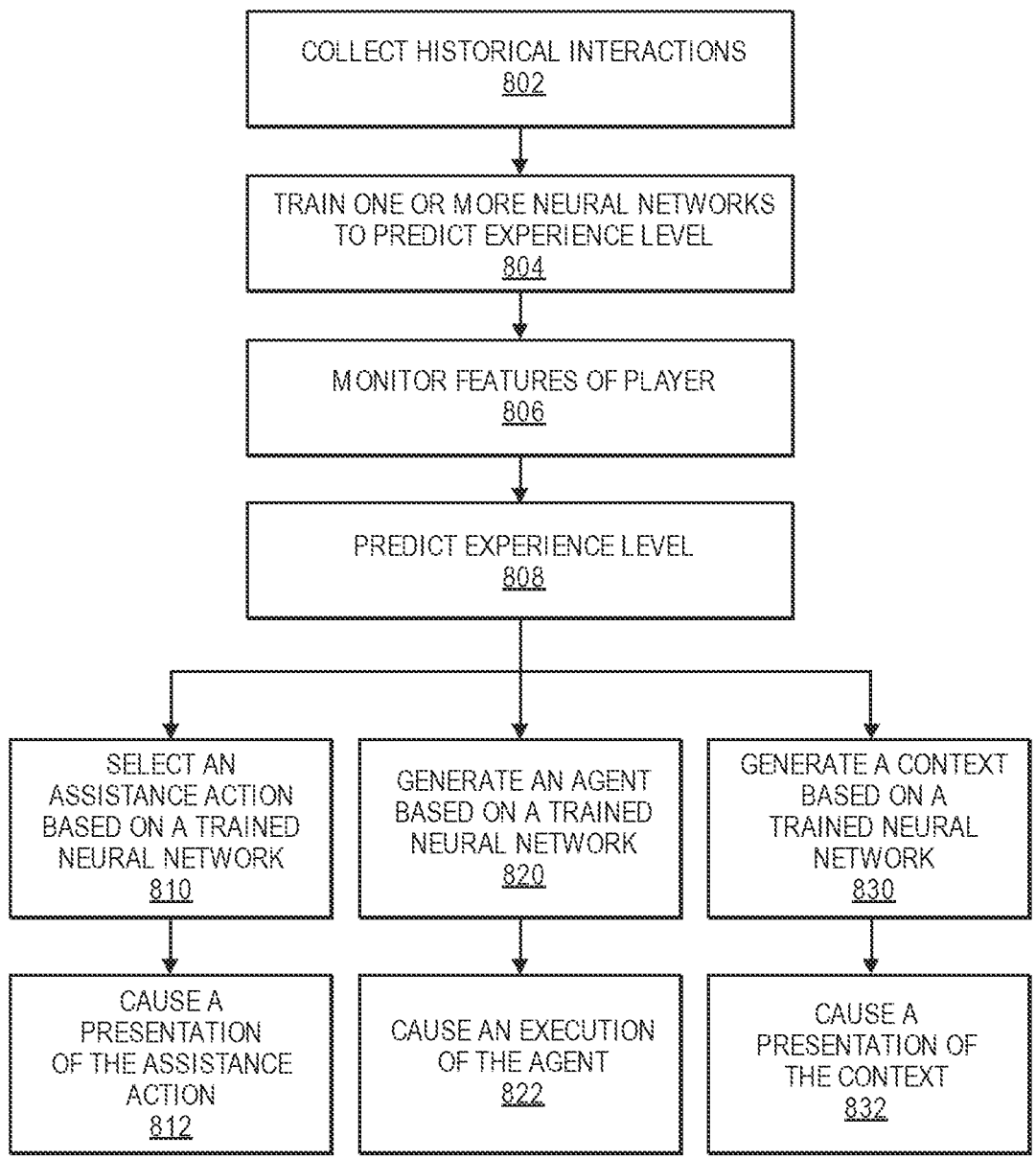
FIG. 8 illustrates an example flow for adapting a video game and providing assistance based on a player's level of experience, according to embodiments of the present disclosure.

FIG. 8 illustrates an example flow for adapting a video game and providing assistance based on a player's level of experience, according to embodiments of the present disclosure. Similarly to FIG. 7, a computer system is described as performing operations of the example flow of FIG. 8. In addition, some of the operations across the two example flows are similar. Such similarities are not repeated herein in the interest of clarity of explanation.

In an example, the flow includes an operation 802, where historical interactions are collected. For instance, the computer system (or some other collection service), monitors interactions of multiple players across one or more video games and can be stored in one or more databases for subsequent training of one or more neural networks. As stored, the historical interactions represent video game session data of the players.

In an example, the flow includes an operation 804, where one or more neural networks are trained to predict an experience level. For instance, the computer system trains one neural network per video game. In this case, video game session data specific to that video game is used. In another illustration, the computer system trains one neural network per genre of video game. In this case, video game sessions across multiple video games belonging to that genre is used. Generally, the training can be supervised or unsupervised and includes inputting the video game session data as input feature vectors to the neural network. If supervised, output vectors identifying the experience levels corresponding to the training feature vectors are also used.

In an example, the flow includes an operation 806, where features of a player are monitored. For instance, the computer system monitors the video game session data of the player while the player is playing a video game.

In an example, the flow includes an operation 808, where an experience level of the player is predicted. For instance, the computer system inputs relevant features from the player's video game session data to a trained neural network as an input feature vector. These features include, for instance, an interaction history of the player with the video game. An output of the trained neural network is a prediction of the experience level and the likelihood of that prediction.

In an example, an operation 810 follows operation 808. At operation 810, an assistance action is selected based on a trained neural network. The assistance action can be associated with a context of the video game. The player may need assistance with interacting with the context. The assistance is provided to decide what are the most likely next step actions for interacting with the context in a successful way. In an illustration, the computer system selects the assistance action from potential actions based on predicted outcomes of performing the potential actions given the experience level of the video game player. The potential actions and the predicted outcomes are learned from the trained neural network based on the historical interactions of the players. Each potential action is a possible assistance action. A respective predicted outcome includes a likelihood of the player successfully interacting with the context if the potential action is performed as a next step. The assistance action represents the potential action that has the highest likelihood of a successful interaction.

In an example, the trained neural network is the same neural network used for predicting the experience level. In another example, the trained neural network is different. In this example, the two networks can be concatenated. Alternatively, the trained network is trained specifically for the experience level (e.g., different neural networks are trained for assistant generators). The training dataset for the trained neural network is a subset of the historical interactions. This subset corresponds to the players and the player's experience level. As such, selecting the action for the player's experience level can also include selecting the proper trained network corresponding to the experience level.

In an example, the flow includes an operation 812, where a presentation of the assistance action is caused. For instance, the computer system causes the video game console to present a UI element in a presentation of the video game. The UI element describes or shows how the assistance action can be performed.

In an further example, the computer system also selects other actions for interacting with the context based on the trained neural network. In this example, the other actions correspond to other experience levels. These actions can also be presented to the player in the same UI element or in separate UI elements. As such, the computer system can also educate the player about, for instance, what more experienced players may interact with the context.

In an example, an operation 820 follows operation 808. At operation 820, a video game agent is generated based on a trained neural network. The video game agent can be adapted to the player's experience level and/or to a context that the player is interacting with. Accordingly, the video game agent represents an adaptive agent.

In an illustration, the computer system trains the video game agent to interact with a virtual player that represents the player in the video game. In this illustration, the video game agent can be executed on the video game console and, upon execution, can be presented as a second virtual player.

Training the video game agent can be accomplished through the trained neural network. Thus, the training can be based on the player's experience level and the historical interactions of other players (at the same or different experience level and/or with the same or a different video game). For instance, an input layer of the neural network is mapped to the historical interactions of the players. An output layer of the neural network is mapped to potential actions available to the players in the video game. Training the video game agent involves configuring the video game agent to perform a subset of the potential actions that results in successful progression of the video game. In other words, the video game agent learns to play the video game from the neural network and accordingly learns what action(s) to perform for different contexts such that the video game agent progresses in the video game at a same or higher experience level of the player.

In an illustration, the computer system detects an interaction of the player with a context of the video game. Based on the trained neural network (e.g., an input thereto of the player's video game session data that includes the context, the interaction, and the player's experience level), the computer system selects an action(s) from potential actions applicable to the context and relevant to the player's experience level. For instance, the action has the highest likelihood of a successful interaction with the context if performed in a next step.

In an example, the trained neural network is the same neural network used for predicting the experience level. In another example, the trained neural network is different. In this example, the two networks can be concatenated. Alternatively, the trained network is trained specifically for the experience level.

In an example, the flow includes an operation 822, where an execution of the video game agent is caused in the video game. For instance, the computer system causes the video game console to execute the video game agent. The video game agent can be presented as the second virtual player that interacts with the player (e.g., the respective virtual player). The video game agent performs the action in association with the context. Accordingly, the second virtual player is shown as performing the action, thereby coaching the player about how to interact with the context at the player's experience level or higher.

In an example, an operation 830 follows operation 808. At operation 830, a context for the video is generated based on a trained neural network. The context can be adapted to the player's experience level. Accordingly, the context represents an adaptive context.

In an illustration, the computer system generates the context from potential contexts based on predicted outcomes of presenting the potential contexts in the video game given the experience level of the video game player. The potential contexts and the predicted outcomes are learned based on the historical interactions of the players.

For instance, the potential contexts and the predicted outcomes are learned based on the trained neural network. An outcome of a potential context represents a level of interest of the player in viewing or interaction with the potential context. An input layer of the trained neural network is mapped to feature vectors of the players. The feature vectors include the historical interactions. An output layer of the neural network is mapped to the potential contexts. The trained neural network predicts the likelihoods of the player's interest in the potential contexts. The context is selected as the potential context that has the highest likelihood.

In an example, the trained neural network is the same neural network used for predicting the experience level. In another example, the trained neural network is different. In this example, the two networks can be concatenated. Alternatively, the trained network is trained specifically for the experience level.

In an example, the context generation is repeated as the player progresses through the video game such that the video game's narrative is adapted to the player. In this example, the computer system detects an interaction with the context generated at operation 830. This interaction becomes part of the player's video game session data and is, thereby, input to the trained neural network as one of the input features. Accordingly, the computer system further predictively generates a next context for presentation in the video game.

In an example, the flow includes an operation 832, where a presentation of the context is caused in the video game. For instance, the computer system causes the video game console to present the context in the video game. The context can be presented as a UI element.

Figure 9:
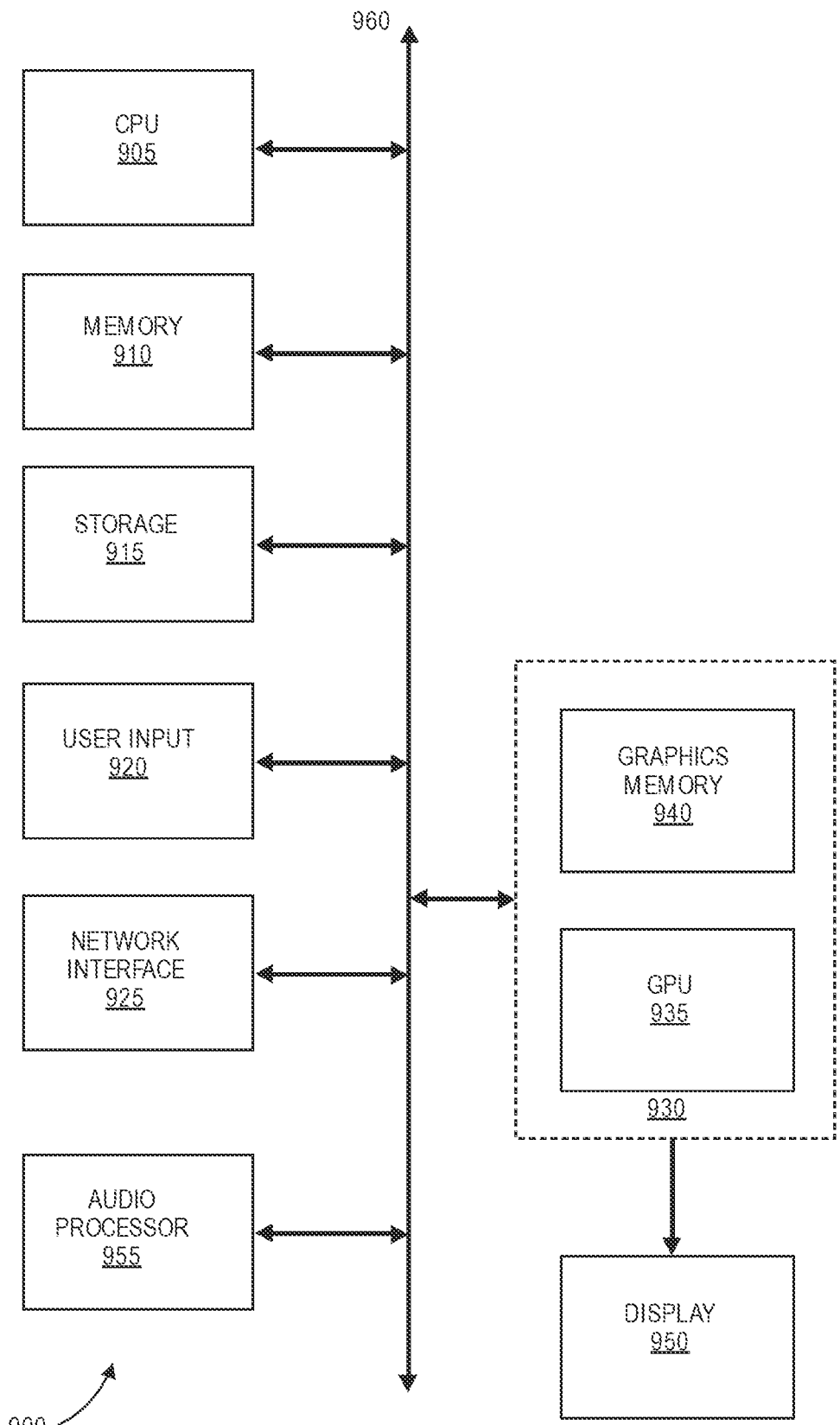
FIG. 9 illustrates an example of a hardware system suitable for implementing a computer system, according to embodiments of the present disclosure.

FIG. 9 illustrates an example of a hardware system suitable for implementing a computer system 900 in accordance with various embodiments. The computer system 900 represents, for example, components of video game console and/or a video game system. The computer system 900 includes a central processing unit (CPU) 905 for running software applications and optionally an operating system. The CPU 905 may be made up of one or more homogeneous or heterogeneous processing cores. Memory 910 stores applications and data for use by the CPU 905. Storage 915 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 920 communicate user inputs from one or more users to the computer system 900, examples of which may include keyboards, mice, joysticks, touch pads, touch screens, still or video cameras, and/or microphones. Network interface 925 allows the computer system 900 to communicate with other computer systems via an electronic communications network, and may include wired or wireless communication over local area networks and wide area networks such as the Internet. An audio processor 955 is adapted to generate analog or digital audio output from instructions and/or data provided by the CPU 905, memory 910, and/or storage 915. The components of computer system 900, including the CPU 905, memory 910, data storage 915, user input devices 920, network interface 925, and audio processor 955 are connected via one or more data buses 960.

A graphics subsystem 930 is further connected with the data bus 960 and the components of the computer system 900. The graphics subsystem 930 includes a graphics processing unit (GPU) 935 and graphics memory 940. The graphics memory 940 includes a display memory (e.g., a frame buffer) used for storing pixel data for each pixel of an output image. The graphics memory 940 can be integrated in the same device as the GPU 935, connected as a separate device with the GPU 935, and/or implemented within the memory 910. Pixel data can be provided to the graphics memory 940 directly from the CPU 905. Alternatively, the CPU 905 provides the GPU 935 with data and/or instructions defining the desired output images, from which the GPU 935 generates the pixel data of one or more output images. The data and/or instructions defining the desired output images can be stored in the memory 910 and/or graphics memory 940. In an embodiment, the GPU 935 includes 3D rendering capabilities for generating pixel data for output images from instructions and data defining the geometry, lighting, shading, texturing, motion, and/or camera parameters for a scene. The GPU 935 can further include one or more programmable execution units capable of executing shader programs.

The graphics subsystem 930 periodically outputs pixel data for an image from the graphics memory 940 to be displayed on the display device 950. The display device 950 can be any device capable of displaying visual information in response to a signal from the computer system 900, including CRT, LCD, plasma, and OLED displays. The computer system 900 can provide the display device 950 with an analog or digital signal.

In accordance with various embodiments, the CPU 905 is one or more general-purpose microprocessors having one or more processing cores. Further embodiments can be implemented using one or more CPUs 905 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 75%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method implemented on a computer system, the method comprising:
   inputting, to an artificial intelligence (AI) model, data about an experience of a user in playing a video game, wherein the AI model is trained based on user interactions with one or more video game contexts at different experience levels, wherein the AI model generates, after training of the AI model and from the data about the experience of the user, outputs indicating parameters that control interactions of a virtual player in the video game, and wherein the parameters cause the interactions of the virtual player to be modeled after at least a subset of the user interactions;
   receiving, from the AI model based on the data, an output indicating a parameter that controls an interaction of the virtual player in the video game; and
   causing a presentation of the interaction of the virtual player in the video game according to the parameter.

2. The method of claim 1, wherein the virtual player is a first virtual player that interacts with a second virtual player corresponding to the user, wherein the interaction is between the first virtual player and the second virtual player.

3. The method of claim 1, wherein the AI model comprises a neural network having an input layer and an output layer, wherein the input layer is mapped to feature vectors of the user, and wherein the output layer is mapped to the interaction.

4. The method of claim 3, wherein the output layer is mapped to potential parameters that control the interaction of the virtual player, and wherein the virtual player performs the interaction based on a subset of the potential parameters.

5. The method of claim 1, wherein the AI model is trained using a training data set that includes game session data of video game players at the different experience levels and across one or more video games.

6. The method of claim 5, wherein the game session data includes video frames and actions that correspond to the user interactions.

7. The method of claim 6, wherein the AI model is further trained to predict an experience level of the user based on a user interaction with a context in the video game.

8. The method of claim 6, wherein the AI model is trained for a genre of the video game, and wherein the user interactions are with different contexts in different video games of the genre.

9. The method of claim 1, wherein the AI model is trained using a training data set that includes a feature vector representing one or more interactions, one or more experience levels, one or more contexts, and one or more actions in the video game.

10. A system comprising:
    one or more processors; and
    one or more memories storing computer-readable instructions that, upon execution by the one or more processors, configure the system to:
       generate an input to an artificial intelligence (AI) model, wherein the input includes data about an experience of a user in playing a video game, wherein the AI model is trained based on user interactions with one or more video game contexts at different experience levels, wherein the AI model generates, after training of the AI model and from the data about the experience of the user, outputs indicating parameters that control interactions of a virtual player in the video game, and wherein the parameters cause the interactions of the virtual player to be modeled after at least a subset of the user interactions;
       determine an output of the AI model based on the input, wherein the output indicates a parameter that controls an interaction of the virtual player in the video game; and
       cause a presentation of the interaction of the virtual player in the video game according to the parameter.

11. The system of claim 10, wherein the virtual player is presented as an interactive graphical user interface (GUI) object, and wherein the output of the AI model sets the parameter that controls the interaction of the GUI object.

12. The system of claim 10, wherein the AI model, the input, and the output are a first AI model, a first input, and a first output, respectively, and wherein the one or more memories store additional computer-readable instructions that, upon execution by the one or more processors, configure the system to:
    generate a second input to a second AI model; and
    determine a second output of the second AI model based on the second input, wherein the second output controls a presentation of a context in the video game.

13. The system of claim 12, wherein the second input includes the experience level, the interaction, and a current context, and wherein the second AI model selects the context from multiple contexts by predicting that the context has a higher likelihood of the user interacting with the context than remaining contexts of the multiple contexts.

14. The system of claim 12, wherein the one or more memories store further computer-readable instructions that, upon execution by the one or more processors, configure the system to:
    detect a user interaction with the context; and
    include the user interaction in the first input to the first AI model, wherein the first output of the first AI model is further based on the user interaction.

15. The system of claim 10, wherein the parameter is a first parameter, and wherein the one or more memories store additional computer-readable instructions that, upon execution by the one or more processors, configure the system to:
    determine, based on the output of the AI model, a second parameter of the virtual player, wherein the second parameter is used to control how the virtual player plays the video game and corresponds to an experience level that is the same or higher than that of the user.

16. The system of claim 10, wherein the interaction corresponds to an action of the virtual player from potential actions in the video game, and wherein the AI model selects the action based on the action having higher likelihood of success than remaining actions of the potential actions.

17. One or more non-transitory computer-readable storage media storing computer-readable instructions that, upon execution on a system, cause the system to perform operations comprising:
   generating an input to an artificial intelligence (AI) model, wherein the input includes data about an experience of a user in playing a video game, wherein the AI model is trained based on user interactions with one or more video game contexts at different experience levels, wherein the AI model generates, after training of the AI model and from the data about the experience of the user, outputs indicating parameters that control interactions of a virtual player in the video game, and wherein the parameters cause the interactions of the virtual player to be modeled after at least a subset of the user interactions;
   determining an output of the AI model based on the input, wherein the output indicates a parameter that controls an interaction of the virtual player in the video game; and
   causing a presentation of the interaction of the virtual player in the video game according to the parameter.

18. The one or more non-transitory computer-readable storage media of claim 17, wherein the virtual player is a first virtual player that interacts with a second virtual player corresponding to the user, wherein the interaction is between the first virtual player and the second virtual player.

19. The one or more non-transitory computer-readable storage media of claim 17, wherein the AI model comprises a neural network having an input layer and an output layer, wherein the input layer is mapped to feature vectors of the user, and wherein the output layer is mapped to the interaction.

20. The one or more non-transitory computer-readable storage media of claim 17, wherein the AI model is trained using a training data set that includes game session data of video game players at the different experience levels and across one or more video games.

* * * * *